June 28, 1949.

T. G. AITCHESON ET AL 2,474,644

PIVOTAL MOUNTING MEANS FOR MICROSCOPE
ARMS AND THE LIKE
Filed Aug. 3, 1946

INVENTORS
THOMAS G. AITCHESON
ALBIN A. GRADISAR
BY
ATTORNEY

Patented June 28, 1949

2,474,644

UNITED STATES PATENT OFFICE 2,474,644

PIVOTAL MOUNTING MEANS FOR MICROSCOPE ARMS AND THE LIKE

Thomas G. Aitcheson, Kenmore, and Albin A. Gradisar, Buffalo, N. Y., assignors to American Optical Company, Southbridge, Mass., a voluntary association of Massachusetts Application August 3, 1946, Serial No. 688,313

4 Claims. (Cl. 88—39)

This invention relates to microscopes and more particularly to new and improved means for mounting the bracket arm of a microscope upon a supporting base or the like for pivotal movement relative thereto.

Considerable weight is carried by the bracket arms of the highly developed present day research, polarizing and like microscopes. During the use of such an instrument, it is often desired by the user of the microscope that the body tube and eye piece or eye pieces thereon be movable to various inclined positions and an inclination joint between the bracket arm and supporting base is generally provided for this purpose. The present invention is directed to new and improved means of a sturdy and economical construction for allowing such pivoting of the bracket arm of a microscope relative to the base in an easy manner and without having "play" or "wabble" occur between such parts of the instrument.

It is, accordingly, an object of the present invention to provide a microscope having new and improved mounting means for allowing tilting movement of the bracket arm thereof relative to its supporting base.

It is a further object of the invention to provide new and improved mounting means for allowing tilting movement of such a bracket arm relative to its supporting base and with said means constructed and arranged to provide greater resistance to pivotal movement of the arm downwardly from its upright position than in the opposite direction.

Another object of the invention is to provide new and improved means for supporting such a microscope bracket arm for vertical tilting movement relative to its supporting base, said means comprising relatively widely spaced bearings of considerable bearing area and friction means for providing different amounts of resistance to pivotal movement of the arm in opposite directions while preventing fore and aft as well as lateral "play" or "wabble" between these relatively movable parts of the instrument.

It is a further object of the invention to provide in a microscope having such improved tilting means readily adjustable means associated with the bracket arm and base of the instrument and arranged in one position thereof to limit tilting movement of said arm to a predetermined range and in a second position thereof to allow free pivotal movement of the arm to positions beyond said range.

Other objects and advantages of the invention will become apparent from the following description taken in conjunction with the accompanying drawing wherein.

Figure 1:
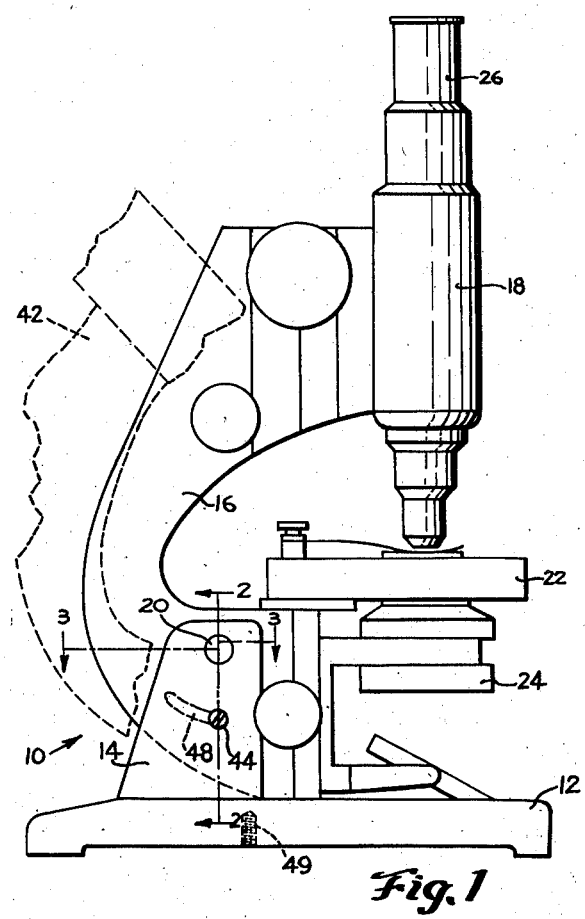
Fig. 1 is a side elevational view of a microscope embodying the present invention.

Referring to the drawing in detail and particularly to Fig. 1, the microscope generally indicated by the numeral 10 comprises a supporting base 12 having spaced upstanding projections 14 provided thereon for supporting a bracket arm 16 carrying a microscope body tube 18. Bracket arm 16 is positioned between the projections 14 and arranged to be supported by a transversely extending generally cylindrical shaft 20 positioned in aligned openings provided in the arm and in the projections, thus forming the inclination joint for the instrument. Also carried by bracket arm 16 are a conventional stage 22 and an adjustable condenser assembly 24. Pivoting of the bracket arm about the shaft 20 allows the eye piece 26 in the case of a monocular microscope, or eye pieces in the case of a binocular microscope, to be conveniently positioned during use of the instrument.

In order to provide a sturdy and smoothly operating construction for allowing such pivotal movement of the bracket arm 16 relative to base 12, applicants' invention comprises the following construction. The spaced upstanding projections 14 are provided with transversely aligned bores 28 into which cylindrical bushings 30 are pressed and arranged to pivotally receive opposite free end portions 31 of shaft 20. This shaft snugly fits into an intermediate bore 32 formed in bracket arm 16 and is securely held in place therein by a pair of set screws 34 threaded through a portion of arm 16 and arranged to engage a flattened surface 36 of shaft 20. This arrangement allows shaft 20 to be firmly located in position in the supporting arm 16 so that the shaft tilts with the arm at all times when the arm is being tilted.

Figure 2:
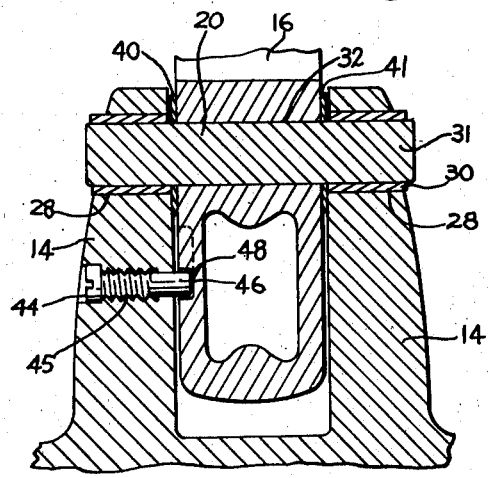
Fig. 2 is an enlarged vertical sectional view taken substantially on line 2—2 of Fig. 1 and looking in the direction of the arrows.

The opposite end portions 31 of shaft 20 project laterally beyond the flattened surface 36 and provide cylindrical bearing surfaces fitting into the bushings 30. Suitable shims or spacer members 40 and 41 are provided between the opposite sides of arm 16 and the adjacent projections 14 and maintain ample clearance between arm 16 and projections 14 so that said arm may be swung from its upright position indicated by full lines in Fig. 1 to various tilted positions toward the left as viewed in Fig. 1 and even to a horizontal position when desired. Means are provided, however, to allow a normal range of pivotal adjustment between said full line position and dotted line position indicated by numeral 42, said means being in the form of an adjustable stop screw 44 threaded into an opening 45 in one of said upstanding projections 14, as shown by Fig. 2, and the screw is provided with a smooth or plain cylindrical inner end 46 arranged to extend through said projection and into an arcuate recess 48 formed in arm 16 concentrically of shaft 20. When this screw or stop means 44 is in its inner or operative position, inner end 46 extends into slot 48 and prevents tilting of the bracket arm to positions beyond the tilting range comprehended between the full line and dotted line positions shown in Fig. 1. When desired, however, stop member 44 may be screwed outwardly sufficiently to withdraw end 46 from slot 48, at which time the microscope arm and the body tube thereon may be swung to positions beyond said range and even into a substantially horizontal position when desired. Obviously, when the instrument is to be moved to such extreme positions of tilt, it will be provided with suitable holddown means of conventional construction such as threaded bolt hole 49 for securing the instrument to its supporting table or the like.

Figure 3:
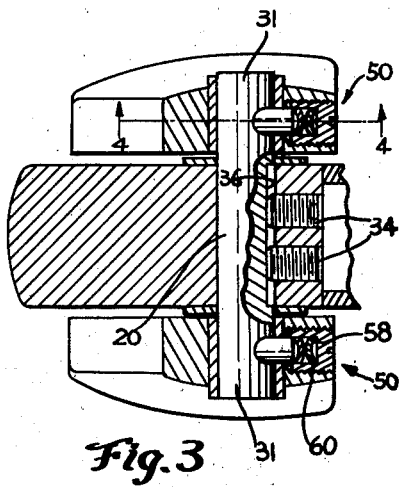
Fig. 3 is an enlarged horizontal sectional view taken substantially on line 3—3 of Fig. 1 and looking in the direction of the arrows.
Figure 4:
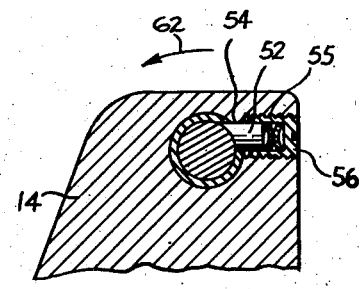
Fig. 4 is a fragmentary sectional view showing details of the invention and taken substantially on line 4—4 of Fig. 3.

In order that the arm 16 and the body tube 18 may be maintained in any position to which they have been adjusted, there is provided suitable means in the form of a pair of adjustable friction brake assemblies 50 operatively associated with the opposite cylindrical end portions 31 of shaft 20. Each such brake assembly, as best shown by Figs. 3 and 4, comprises a brake shoe or element 52 arranged to move in an opening 54 drilled or otherwise formed to extend through an upper portion of the associated projection 14 and arranged so as to have its inner end engaging one of the cylindrical end portions 31 of shaft 20. The outer end portion of opening 54 is somewhat enlarged and provided with threads as indicated at 55 so that a threaded recessed plug 56 may be threaded into said opening and have the flat end portion of the brake shoe 52 enclosed within recess 58 formed in said plug. Also enclosed within this recess 58 are a pair of bent spring washers or the like 60 which are arranged with their bent surfaces opposing each other so that as plug 56 is threaded into the opening a sufficient amount these spring washers 60 will be caused to resiliently engage the adjacent flat end of brake shoe 52 and force its partially cylindrically curved opposite end into frictional engagement with surface 31 on shaft 20. By properly adjusting each plug 56 in projections 14 any desired amount of frictional resistance may be provided for shaft 20, and thus bracket arm 16 may be maintained in any angularly adjusted position.

As best shown by Fig. 4, each brake shoe 52 is arranged to engage shaft 20 at a location offset from the center or longitudinal axis of the shaft and this provides two particularly advantageous results; namely, it provides a slightly greater resistance to pivotal movement of shaft 20 when the arm 16 and head 18 are moved in the direction indicated by arrow 62 than will be frictional resistance afforded these parts when the arm and head are moved in the opposite direction and, secondly, it prevents "wabble" or "play" in the inclination joint such as might otherwise occur if merely an "on center" arrangement were being employed. These desirable results are accomplished because the resilient pressure on each brake shoe 52 is continuously tending to wedge the shoe into the acute angle formed between shaft 20 and the side wall of opening 54. Thus the friction brake shoe 52 and the associated parts are arranged to provide an appreciable resistance to the bracket arm as it is being tilted towards a horizontal position and a slightly lesser resistance thereto when it is being moved in the opposite direction. This arrangement thus compensates for the weight of the tiltable parts of the microscope pivoting about the inclination axis of shaft 20 and to the microscopist using the instrument the resistance to tilting movement of the arm 16 in either direction feels to be about the same.

Having described the invention, we claim:

1. In a microscope of the character described the combination of a base, a pair of spaced upstanding rigid projections carried thereby, a bracket arm positioned between said projections and arranged to support the body tube of the microscope on an upper portion thereof, and means for mounting said bracket arm for vertical tilting movement relative to said base and about a substantially horizontally disposed axis, said means comprising a shaft extending through aligned openings in said bracket arm and in said projections, means for fixedly securing said shaft in said arm for pivotal movement therewith, and friction means including a spring pressed brake element positioned in each of said projections and engaging spaced cylindrical end portions of said shaft and exerting a pressure in a direction offset relative to the longitudinal axis of said shaft so as to provide a resistance to rotation of said shaft in one direction and a greater resistance to the rotation thereof in the opposite direction.

2. In a microscope of the character described the combination of a base, a pair of spaced upstanding rigid projections fixedly carried thereby, a bracket arm having a lower portion positioned between said projections and an upper portion arranged to support a body tube thereon, and means for mounting said bracket arm for vertical tilting movement relative to said base and about a substantially horizontally disposed axis so as to allow said body tube to be moved between a substantially upright position and an inclined position, said means comprising a shaft extending through aligned openings in the lower portion of said bracket arm and adjacent portions of said projections, means for fixedly securing said shaft in said arm for pivotal movement therewith, and friction means carried by each projection and each arranged to engage a cylindrical end portion of said shaft, each friction means comprising a movable brake element, spring means and an adjustable screw threaded member positioned in a threaded opening formed in said projection, said adjustable member being arranged to press said spring means so as to urge said brake element into an operative position against said shaft for providing frictional resistance to rotation of said shaft, said brake element exerting a pressure along a line offset relative to the longitudinal axis of said shaft, whereby a greater frictional resistance to pivotal movement of said shaft toward said inclined position is afforded than the pivotal movement thereof in the opposite direction.

3. In a microscope of the character described the combination of a base member having a pair of spaced upstanding rigid projections thereon, a body tube supporting member positioned therebetween, and means for mounting said supporting member for vertical tilting movement relative to said base member and about a substantially horizontally disposed axis, said means comprising a shaft extending through aligned openings formed in said projections and in said supporting member, said shaft being fixedly secured to said supporting member for pivotal movement therewith, and friction means carried in a bore in one of said projections and including a spring pressed brake shoe engaging a cylindrical portion of said shaft for providing frictional resistance to the tilting movement thereof in either direction, said bore being so located in said projection and relative to the opening therein as to cause said brake shoe in engagement with said cylindrical portion to exert a pressure along a line offset to one side of the axis of said shaft so as to provide a greater resistance to pivotal movement of said shaft and supporting member in one direction than in the opposite direction.

4. In a microscope of the character described, the combination of a base member, a body tube supporting member carried thereby and arranged for vertical tilting movement in opposite directions relative thereto, one of said members having a pair of spaced portions providing a recess therebetween, the other of said members having a portion positioned in said recess, said portions of said members being provided with substantially horizontally disposed and axially aligned apertures therein, and means for mounting said body tube supporting member so as to allow said vertical tilting movement about a substantially horizontally disposed axis extending through said aligned apertures, said means comprising a shaft positioned in said aligned apertures and fixedly secured to the portion of the member located in said recess, and friction means carried in a bore in one of said spaced portions and including a spring pressed brake shoe engaging a cylindrical surface portion of said shaft for providing frictional resistance to the pivotal movement thereof in either direction, said bore being so located in the spaced portion supporting same and relative to the horizontally disposed aperture therein as to cause said brake shoe in engagement with said cylindrical surface portion to exert a pressure along a line offset to one side of the axis of said shaft so as to provide a greater resistance to pivotal movement of said shaft and the member fixedly secured thereto in one direction then in the opposite direction.

THOMAS G. AITCHESON.
ALBIN A. GRADISAR.

REFERENCES CITED

The following references are of record in the file of this patent:

UNITED STATES PATENTS

| Number | Name | Date |
|---|---|---|
| 352,639 | Allen | Nov. 16, 1886 |
| 1,465,569 | Arnold | Aug. 21, 1923 |
| 1,555,781 | Amsden | Sept. 29, 1925 |
| 2,215,548 | Duffield | Sept. 24, 1940 |
| 2,318,871 | MacDonald | May 11, 1943 |